United States Patent [19]
Suzuki et al.

[11] Patent Number: 5,099,468
[45] Date of Patent: Mar. 24, 1992

[54] OPTICAL INFORMATION PROCESSING APPARATUS HAVING OFFSET ADJUSTING CIRCUIT WHICH CAN BE EXCHANGED TOGETHER WITH OPTICAL HEAD

[75] Inventors: Yasuo Suzuki, Tokyo; Shigeru Aoi, Kawasaki, both of Japan

[73] Assignee: Canon Kabushiki Kaisha, Tokyo, Japan

[21] Appl. No.: 713,610

[22] Filed: Jun. 11, 1991

Related U.S. Application Data

[63] Continuation of Ser. No. 306,383, Feb. 6, 1989, abandoned.

Foreign Application Priority Data

Feb. 8, 1988 [JP] Japan .................................. 63-25795

[51] Int. Cl.⁵ .............................................. G11B 7/00
[52] U.S. Cl. ............................ 369/44.32; 369/44.14; 369/44.36
[58] Field of Search ............... 369/44.11, 44.14, 44.27, 369/44.29, 44.32, 44.35, 44.36, 53, 54, 55, 116; 360/114

[56] References Cited

U.S. PATENT DOCUMENTS

| | | | |
|---|---|---|---|
| 4,293,944 | 10/1981 | Izumita et al. | 369/45 |
| 4,607,157 | 8/1986 | Millar et al. | 369/44.29 |
| 4,707,648 | 11/1987 | Minami | 369/44.35 X |
| 4,730,294 | 3/1988 | Funada | 369/44.35 X |
| 4,763,199 | 8/1988 | Suzuki | 358/280 |
| 4,783,590 | 11/1988 | Aoi | 250/202 |

Primary Examiner—Robert L. Richardson
Attorney, Agent, or Firm—Fitzpatrick, Cella, Harper & Scinto

[57] ABSTRACT

An optical information processing apparatus is so constructed that an optical head in the apparatus for recording and/or reproducing information by irradiating a light beam onto a recording medium is exchangeably attached to an apparatus main body, wherein a circuit which compensate for an offset of an electric signal which is output from the optical head, is attached to the apparatus main body so that it can be exchanged together with the optical head, thereby making unnecessary an offset adjustment after the optical head has been exchanged.

17 Claims, 4 Drawing Sheets

OPTICAL INFORMATION PROCESSING APPARATUS HAVING OFFSET ADJUSTING CIRCUIT WHICH CAN BE EXCHANGED TOGETHER WITH OPTICAL HEAD

This application is a continuation of prior application Ser. No. 07/306,383 filed Feb. 6, 1989, now abandoned.

BACKGROUND OF THE INVENTION

1. Field of the Invention

The present invention relates to an optical information processing apparatus in which a light beam is irradiated onto an optical information recording medium such as an optical disk or the like and information is recorded and reproduced and/or erased.

2. Related Background Art

An optical information processing apparatus in which light from a light source is irradiated onto an optical recording medium and information is recorded and reproduced and/or erased has been recently studied and developed more and more from a viewpoint that an extremely large amount of information can be recorded.

As a recording medium which can record, reproduce, and erase information by a light beam, there has been known what is called a magneto-optic disk comprising a disk-shaped substrate made of glass, plastics, or the like and a perpendicular magnetization film which is formed on the substrate and ordinarily has a thickness of 100 to 500Å. The perpendicular magnetization film is made of an amorphous alloy or the like and has a characteristic such that the film is magnetized in the direction perpendicular to the film surface.

To record information into a memory using such a magneto-optic disk, first, the magnetizing direction of the perpendicular magnetization film is previously aligned in one direction by effecting the magnetic field in the perpendicular direction on the magneto-optic disk. Then, the laser beam spot which has been digitally modulated by an information signal is irradiated onto the perpendicular magnetization film, thereby raising the temperature of the perpendicular magnetization film in this portion to the Curie point or higher. Thus, the magnetizing direction of the portion to which the laser beam spot was irradiated is reversed by the influence of the peripheral magnetic field and the logic value "1" (or "0") is recorded and a recording pit is formed. To raise the temperature of the perpendicular magnetization film to the Curie point or higher as mentioned above, a laser power of 8 to 10 mW is needed. Likewise, in the case of a low temperature, a large laser power of about 14 mW is also needed. When considering the efficiencies of various optical parts on the optical head, a laser power of about 30 to 35 mW is necessary as that of the semiconductor laser apparatus.

In such an optical information processing apparatus as mentioned above, when the life of the semiconductor laser as the light source has come, the laser needs to be exchanged. Particularly, in the magneto-optic disk memory, since light of a large power of about 14 mW is irradiated in the erasing mode, the life of the light source is short, and it is considered that the number of exchanging times of the light source is also large.

When the light source is exchanged, it is desirable to exchange the entire optical head, including the optical system, in order to make it unnecessary to perform positional adjustment with respect to other devices such as a photodetector and the like. The exchange of the optical head will be described with reference to FIG. 1. FIG. 1 shows only an electric circuit from a sensor to an actuator and the other portions are constructed as shown in an apparatus disclosed in, for instance, U.S. Pat. No. 4,293,944. Each of the focusing error signals and tracking error signal are obtained by what is called an astigmatism method and a push-pull method.

In FIG. 1, reference numeral 10 denotes a servo sensor which is divided into four sensor elements; reference numerals 22-1 to 22-4 indicate current/voltage converting amplifiers for converting four outputs of the servo sensor into voltages, respectively; 23-1 and 23-2 indicate adding amplifiers each for obtaining a signal indicative of the sum of the two output signals of each of the two sensor elements on a diagonal of the servo sensor 10; reference numeral 24 indicates a variable resistor to adjust the balance of outputs of the adding amplifiers 23-1 and 23-2; 25 a differential amplifier to obtain the difference between the outputs of the amplifiers 23-1 and 23-2 to thereby obtain a focusing error signal; 26 a variable resistor to adjust an amplitude of the focusing error signal to thereby standardize a voltage which is output in accordance with the focusing error; 27 a focusing error control circuit for outputting a signal to move an objective lens in accordance with the focusing error and for outputting a signal to initially execute the pull-in to a focal point; reference numerals 28-1 and 28-2 indicate amplifiers to drive a coil of a focusing actuator 29 to move &he objective lens in accordance with the output signal of the focusing error control circuit 27; 30-1 and 30-2 adding amplifiers for outputting signals indicative of the sums of the outputs of the left half two sensor elements and of the right half two sensor elements of the servo sensor 10; reference numeral 31 indicates a variable resistor to adjust the balance of outputs of the adding amplifiers 30-1 30-2; 32 a differential amplified to calculate the difference between the sum of the outputs of the left half sensor elements and of the right half sensor elements of the servo sensor 10 to thereby obtain a tracking error signal; 33 a variable resistor to standardize an output voltage in accordance with the tracking error; 34 a tracking control circuit for outputting a signal to move the objective lens in accordance with a tracking error and for outputting a signal to jump a laser beam spot to the adjacent track and the like; and 35-1 and reference numerals 35-2 indicate amplifiers to drive a coil of a tracking actuator 36 to move the objective lens in accordance with the output signal of the tracking control circuit 34.

The left half portion in FIG. 1 is assembled in the optical head and can be integrally exchanged. On the other hand, the right half portion in FIG. 1 is assembled in the electric circuit board on the main body side and this portion is not exchanged even when the optical head is exchanged.

Even in such an optical head constructed as a unit as mentioned above, there is a limitation of the accuracy of the mechanical positional adjustment among the elements assembled in the optical head. In addition, there is also a variation in the light emitting pattern of the semiconductor laser depending on the laser. Therefore, the outputs of the four sensor elements of the servo sensor 10 slightly differ for every optical head. Thus, in order to set an objective position of the focusing control to an in-focus position and to set an objective position of the tracking control to the center of the track, the offset needs to be adjusted by a circuit to arithmetically operate the sensor outputs. Such an offset adjustment is executed by the variable resistors 24 and 31, respectively. On the other hand, the adjustment to standardize the output of the difference signal and to equalize the gain of the control loop is executed by the variable resistors 26 and 33. The adjustments of the objective positions by the variable resistors 24 and 31 are performed while observing the waveform of the signal reproduced from a disk. The objective positions are adjusted to the positions such that the amplitude of the reproduced signal becomes maximum and the signal can be reproduced without a distortion.

However, since an apparatus such as an oscilloscope or the like is needed for the above adjustments, there is a problem that the user cannot perform the adjustments and the load of the maintenance on the manufacturer side is large.

SUMMARY OF THE INVENTION

It is an object of the present invention to solve the problems in the conventional techniques as mentioned above and to provide an optical information processing apparatus in which there is no need to perform the offset adjustment in association with the exchange of an optical head.

The above object of the invention is accomplished by an optical information processing apparatus in which an optical head for recording and/or reproducing information by irradiating a light beam onto a recording medium is exchangeably attached to the apparatus main body, and wherein a circuit to compensate for an offset of an electric signal which is output from the optical head is attached to the apparatus main body so that it can be exchanged together with the optical head.

That is, according to the invention, since the offset of the exchangeable unit comprising the optical head and offset adjusting circuit has already been adjusted, the exchange of the unit due to the expiration of the life of a light source or the like can be executed without any adjustment.

DETAILED DESCRIPTION OF THE PREFERRED EMBODIMENTS

Figure 2:
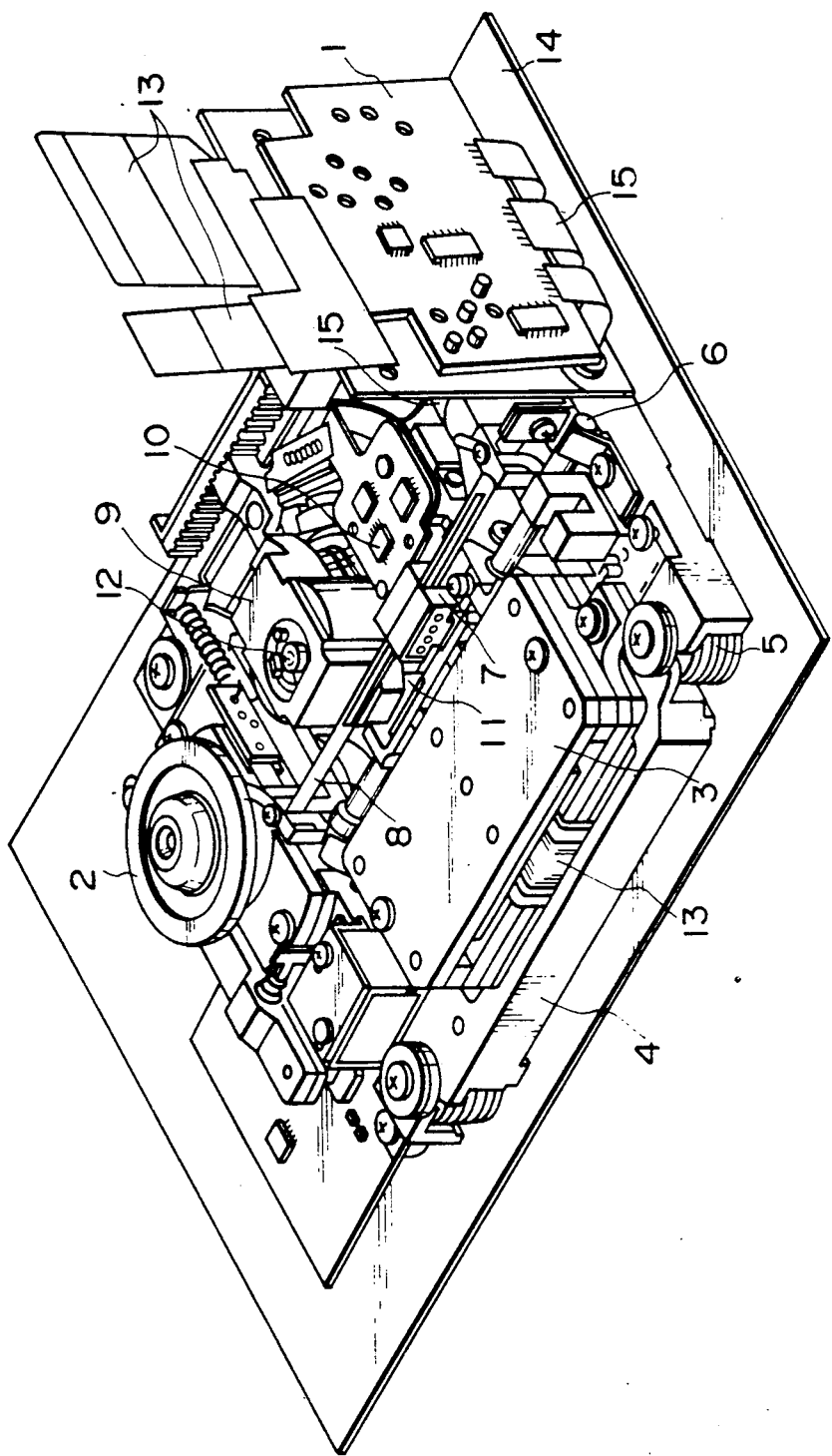
FIG. 2 is a perspective view of a main body showing an embodiment of an optical information processing apparatus according to the present invention.
Figure 3:
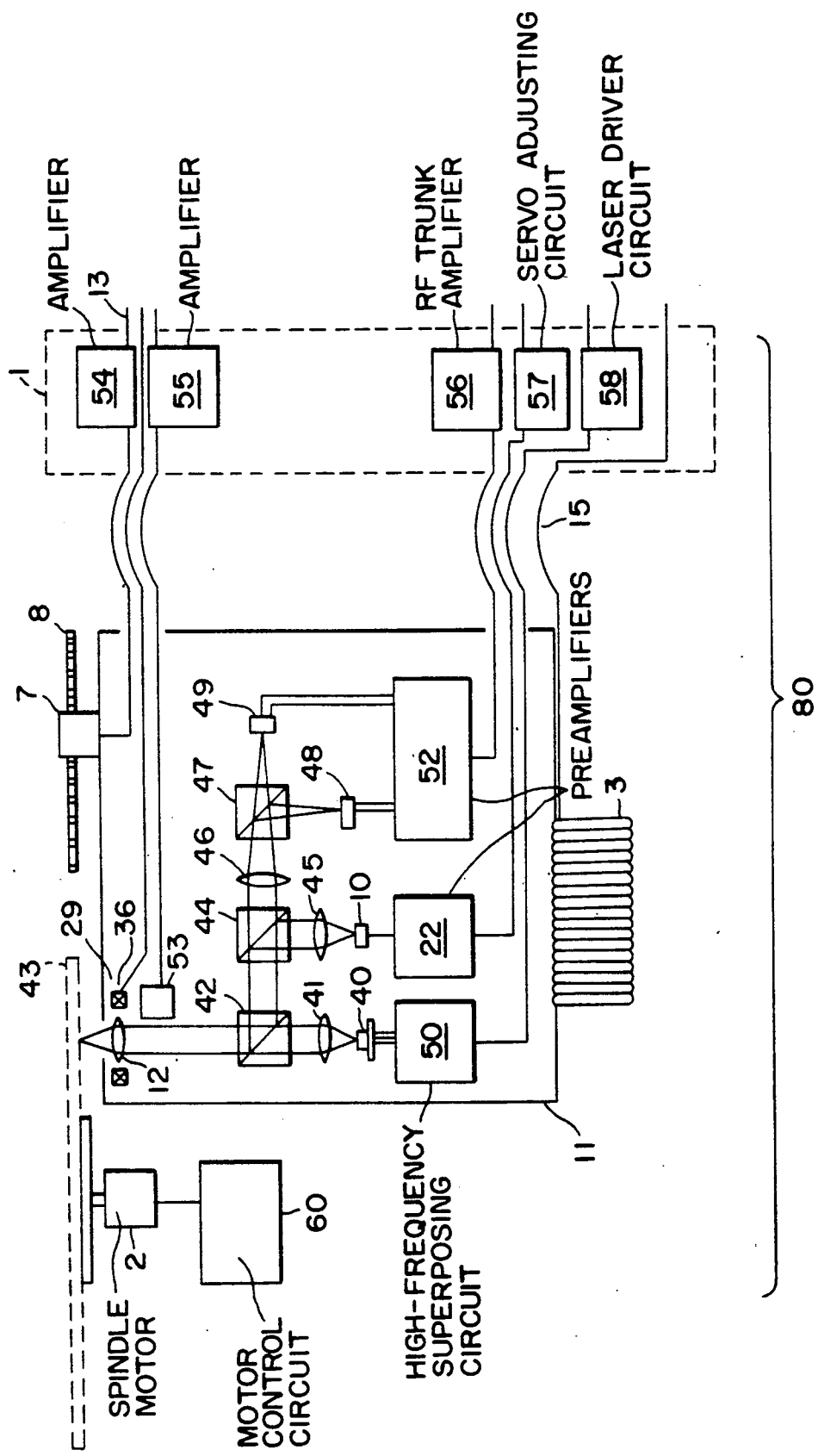
FIG. 3 is a block diagram of the embodiment of FIG. 2.

FIG. 2 is a perspective view of a schematic construction showing an embodiment of an optical information processing apparatus according to the present invention and FIG. 3 is a block diagram of FIG. 2.

In these figures, reference numeral 1 denotes an adjusting board as a characteristic section of the present invention; 2 indicates a spindle motor to rotate a disk; 3 a linear motor to move an optical head; 4 a base plate; 5 a vibration damping spring and rubber; 6 a rail to guide the optical head; 7 a linear sensor to detect position of the optical head; 8 a linear encoder plate; 9 an actuator cover; 10 a servo sensor; 11 an optical head; 12 an objective lens provided in the optical head 11; 13 a flexible board for connecting the adjusting board 1 to an electric circuit on the apparatus main body side; 14 a bottom plate of the apparatus main body; and 15 a flexible board for connecting the optical head to the adjusting board 1.

In the embodiment, all of the adjusting circuit sections of the laser driver, servo sensor, RF preamplifier, linear sensor 7, and position sensor of the objective lens are arranged on the adjusting board 1. The adjusting board 1 is exchangeably attached to the apparatus body. On the other hand, additional portions which need to be adjusted due to the exchange of the optical head also can be arranged on the adjusting board 1.

In the embodiment, to make the exchange easy, the adjusting board 1 is attached to the base plate 4 on which the optical head unit 11, linear motor 3, spindle motor 2, and the like are attached, and the whole assembly is constructed as an exchangeable part (exchangeable unit) when the life of the laser expires.

In FIG. 3, a laser beam emitted from a semiconductor laser 40 assembled in the optical head 11 passes through a collimating lens 41, a beam splitter 42, and the objective lens 12 and is focused onto a magneto-optic disk 43. The light reflected by the disk 43 again passes through the objective lens 12 and is reflected by the beam splitter 42 and is separated from the incident light. The separated light is divided into two light beams by a beam splitter 44. One of the light beams is given an astigmatism by a toric lens 45 and, thereafter, it is detected by the sensor 10 consisting of four sensor elements. A focusing error signal and a tracking error signal are detected by the astigmatism method and push-pull method mentioned above. The other divided laser beam is focused by a condenser lens 46 and is further divided into two laser beams by a deflecting beam splitter 47 and detected by photosensors 48 and 49, respectively. Outputs of the photosensors are input to a preamplifier 52 and a differential reproduction signal is detected.

The reproduction signal which is output from the preamplifier 52 is transmitted through an RF trunk amplifier 56 on the adjusting board 1 and is sent to the circuit on the apparatus body side (not shown) by the flexible board 13 to connect with the apparatus body. The servo signal detected by the sensor 10 is amplified by a preamplifier 22 and is transmitted through a servo adjusting circuit 57 on the adjusting board 1 and through the circuit on the apparatus body side (not shown) and is returned to the focusing actuator 29 and tracking actuator 36. On the other hand, the semiconductor laser 40 is driven by a laser driver circuit 58 on the adjusting board 1 and a high-frequency superposing circuit 50 in the optical head unit 11. Further, an amplifier 55 connected to a sensor 53 to detect the position of the objective lens 12 and an amplifier 54 connected to the linear sensor 7 are also attached to the adjusting board 1. The spindle motor 2 is constructed integrally with a control circuit 60 of the motor. In the embodiment, a construction encompassed by reference numeral 80 in FIG. 3 is exchanged as an integrated unit when the laser is exchanged.

Figure 1:
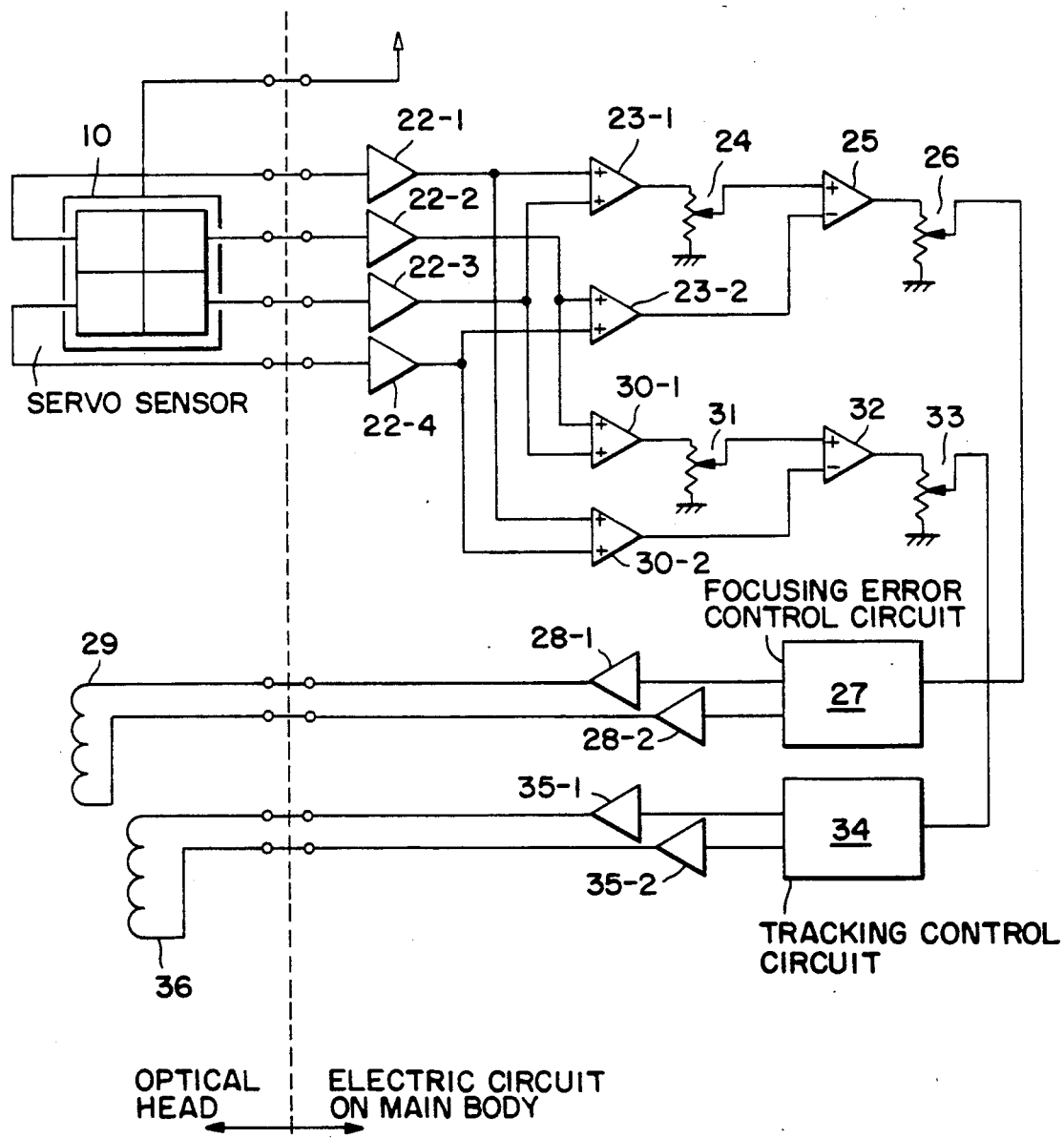
FIG. 1 is a diagram showing a servo signal detecting circuit in a conventional optical information processing apparatus.
Figure 4:
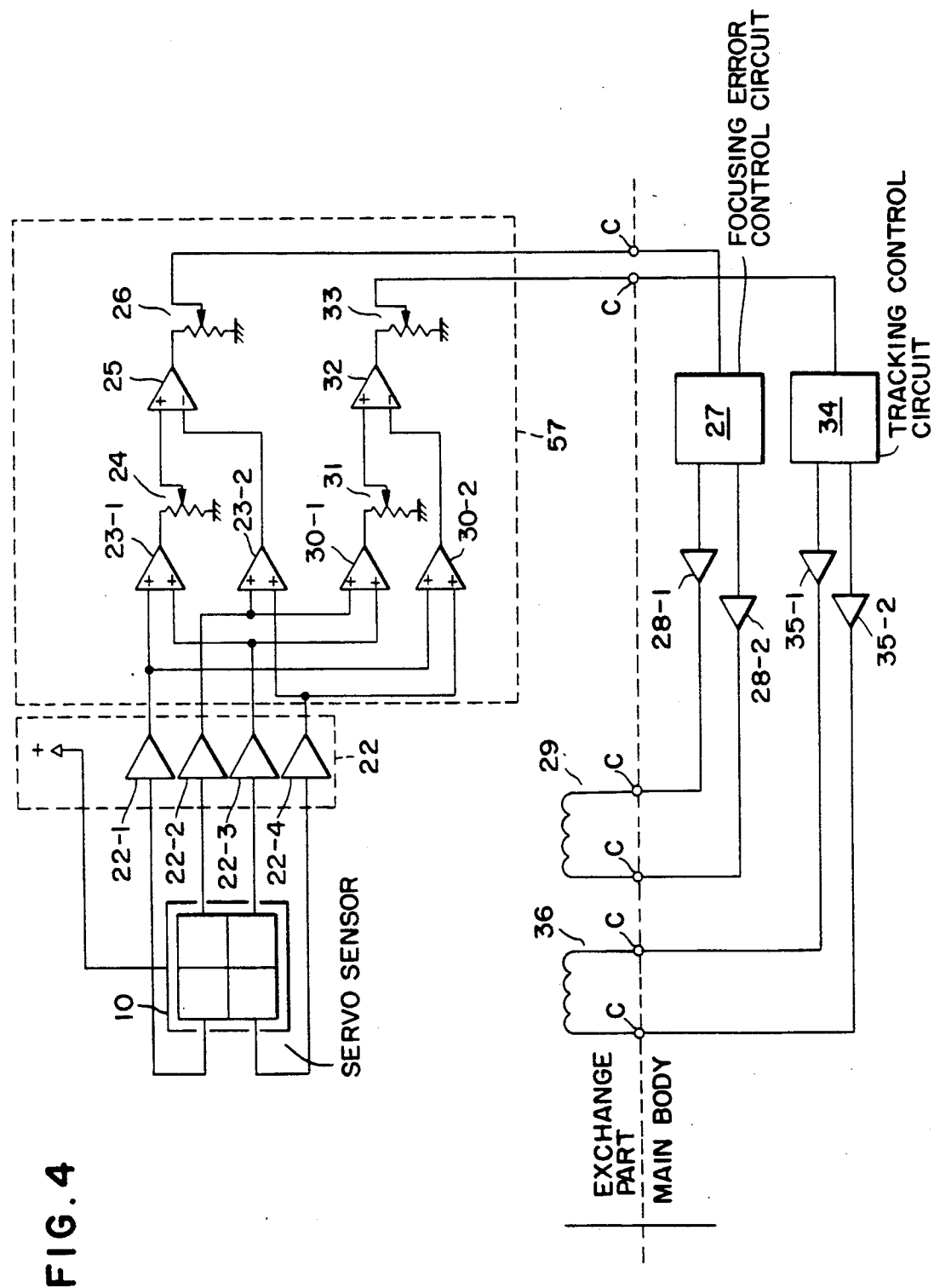
FIG. 4 is a circuit diagram showing the details of the embodiment of FIG. 2.

FIG. 4 shows the details of the auto focusing circuit and auto tracking circuit in FIG. 3. The same parts and components as those in the conventional apparatus in FIG. 1 are designated by the same reference numerals. The variable resistors 24, 26, 31, and 33 are adjusted in accordance with the position of the sensor 10 and the sensitivities of the actuators 36 and 29 so that the gains of the control loops for auto focusing and auto tracking are set to be constant. The upper half portion in FIG. 4 corresponds to the portion which is exchanged together with the laser and the lower half portion corresponds to the portion on the apparatus main body side. Since the variable resistors are included in the exchangeable portion, the differences of the adjusting positions of the variable resistors due to the positional relation between the laser and the sensor and the differences of the adjustment positions of the variable resistors due to a variation of the sensitivities of the actuators are all included in the exchangeable portion. The exchangeable portion and the apparatus body are coupled by a disconnectable connector C so as to make the exchange easy. On the other hand although not shown, the laser driver circuit 58 includes a circuit to monitor the light emission from the rear surface of the laser and includes a variable resistor to standardize the ratio of the light amount and the monitor current. The trunk amplifier 56 includes variable resistors to adjust the gains in order to adjust a variation in sensitivity of the photosensors 48 and 49 and a variation in transmission efficiency of the optical system. The linear sensor amplifier 54 includes a variable resistor to adjust a variation in output of the linear sensor 7. Therefore, to adjust those variable resistors, it is sufficient to previously adjust them in the exchangeable unit and there is no need to adjust them when the parts are exchanged.

The invention is not limited to the foregoing embodiment, but many variations, modifications, and applications are possible. For instance, although the variable resistors have been used in the adjusting sections in the embodiment, the invention is not limited to them. If such adjustments can be realized by positional adjustment, then variable capacitors, variable inductances, optical filters, or the like, also can be used.

On the other hand, the construction to be exchanged is not limited to the structure shown in FIGS. 2 and 3. The elements which are assembled in the exchangeable unit can be selected in accordance with a construction of the recording and reproducing apparatus. Further, although the embodiment has been described with respect to the magneto-optic disk apparatus as an example, the invention also can be applied to the general optical information processing apparatus. For instance, an optical card apparatus can be used as such an apparatus to which the invention can be applied.

The present invention has an advantage such that since the circuit to adjust a variation in characteristics of the optical head also can be exchanged together with the optical head, it is unnecessary to perform such an adjustment in association with the exchange. Therefore, the reason for the exchange of the optical head is not limited to the expiration of the life of the light source, but may be caused by any failures of the optical system, drive system, photosensors, or the like.

The present invention incorporates all such examples of application within the spirit and scope of the appended claims of the invention.

What is claimed is:

1. An optical information processing apparatus comprising:
   a base;
   an optical head detachably attached to said base, said optical head comprising:
   (a) a light source for emitting a light beam;
   (b) an optical system for directing a light beam from said light source to an information recording medium, and for irradiating the information recording medium with a condensed light beam;
   (c) focusing and/or tracking adjusting means for adjusting a focusing and/or tracking condition of the condensed light beam irradiating the information recording medium; and
   (d) a detector for detecting light reflected from the information recording medium when irradiated with the condensed light beam, and for producing an output signal;
   an adjusting circuit, detachably attached to said base, for adjusting an offset of the output signal produced by said detector; and
   a signal processing circuit attached to said base, said signal processing circuit comprising at least one control circuit capable of being electrically connected to said adjusting circuit through a connector, and comprising means for controlling said focusing and/or tracking adjusting means in accordance with the output signal produced by said detector and received through said adjusting circuit.

2. An apparatus according to claim 1, wherein said optical head and said adjusting circuit are detachably attached and are capable of being integrally attached to said base.

3. An apparatus according to claim 1, wherein said adjusting circuit comprises a variable resistor.

4. An apparatus according to claim 1, wherein the output signal produced by said detector comprises at least one of a tracking error signal and a focusing error signal.

5. An apparatus according to claim 1, wherein the output signal produced by said detector comprises a reproduction signal of the information recorded on the information recording medium.

6. An apparatus according to claim 1, wherein said optical head further comprises a head position sensor for detecting a position of said optical head and for producing an output signal, and said apparatus further comprises a circuit, detachably attached to said base, for adjusting a variation in the output signal produced by said head position sensor.

7. An optical head unit for use in an optical information processing apparatus, said optical head unit comprising:
   a light source for emitting a light beam;
   an optical system for directing a light beam from said light source to an information recording medium, and for irradiating the information recording medium with a condensed light beam;
   focusing and/or tracking adjusting means for adjusting a focusing and/or tracking condition of the condensed light beam irradiating the information recording medium;
   a photodetector for detecting light reflected from the information recording medium when irradiated with the condensed light beam, and for producing an output signal;
   an adjusting circuit for adjusting an offset of the output signal produced by said photodetector; and
   a connector terminal for electrically connecting a signal processing circuit mounted on a main body of said optical information processing apparatus, said signal processing circuit comprising a control circuit for controlling said focusing and/or tracking adjusting means in accordance with the output signal produced by said photodetector and received through said adjusting circuit.

8. An optical head unit according to claim 7, wherein said adjusting circuit comprises a variable resistor.

9. An optical head unit according to claim 7, wherein the output signal produced by said photodetector comprises at least one of a tracking error signal and a focusing error signal.

10. An optical head unit according to claim 7, wherein the output signal produced by said photodetector comprises a reproduction signal of the information recorded on the information recording medium.

11. An optical head unit according to claim 7, further comprising a position sensor for detecting position of said optical head unit and for producing an output signal, and a second adjusting circuit for adjusting a variation of the output signal produced by said position sensor.

12. An optical information processing apparatus in which an optical head, for recording information on and/or reproducing information from a recording medium by applying a light beam to the recording medium, is detachably attached to a main body of the apparatus,
characterized in that an adjusting circuit, for adjusting an offset of an electrical signal output from said optical head, is detachably attached to the main body of the apparatus together with said optical head so that said optical head is capable of being replaced free of offset adjustment of the electrical signal output from said optical head.

13. An apparatus according to claim 12, wherein said adjusting circuit is capable of being replaced together with said optical head.

14. An apparatus according to claim 12, wherein said adjusting circuit comprises a variable resistor.

15. An apparatus according to claim 12, wherein the electrical signal output from said optical head comprises at least one of a tracking error signal and a focusing error signal.

16. An apparatus according to claim 12, wherein the electrical signal output from said optical head comprises a reproduction signal of the information recorded on the recording medium.

17. An optical information processing apparatus, comprising:
a base;
a light source detachably attached to said base, for emitting a light beam;
an optical system for directing a light beam from said light source to an information recording medium, and for irradiating the information recording medium with a condensed light beam;
focusing and/or tracking adjusting means for adjusting a focusing and/or tracking condition of the condensed light beam irradiating the information recording medium;
a photodetector detachably attached to said base, for detecting light reflected from the information recording medium when irradiated with the condensed light beam, and for producing an output signal;
an adjusting circuit, detachably attached to said base, for adjusting an offset of the output signal produced by said photodetector; and
a signal processing circuit attached to said base, said signal processing circuit capable of being electrically connected to said adjusting circuit through a connector, and comprising a control circuit for controlling said focusing and/or tracking adjusting means in accordance with the output signal produced by said photodetector and received through said adjusting circuit.

* * * * *

UNITED STATES PATENT AND TRADEMARK OFFICE
CERTIFICATE OF CORRECTION

PATENT NO. : 5,099,468

DATED : March 24, 1992

INVENTOR(S) : Yasuo Suzuki, et al.

It is certified that error appears in the above-identified patent and that said Letters Patent is hereby corrected as shown below:

ON THE COVER PAGE

UNDER U.S. PATENT DOCUMENTS

"Aol" should read --Aoi--.

The following should be inserted as a new header --OTHER PUBLICATIONS--.

The following should be inserted as a new citation under the above-noted header: --Ura, et al., "An Integrated-Optic Disk Pickup Device," 433B Electronics & Communications in Japan/Part II: Electronics, Vol. 70, No. 2, Feb. 1987, pp. 92 through 100.

IN THE ABSTRACT

Line 6, "compensate" should read --compensates--.

IN THE DISCLOSURE

COLUMN 1

Line 58, "come," should read --expired,--.

UNITED STATES PATENT AND TRADEMARK OFFICE
CERTIFICATE OF CORRECTION

PATENT NO. : 5,099,468

DATED : March 24, 1992

INVENTOR(S) : Yasuo Suzuki, et al.

It is certified that error appears in the above-identified patent and that said Letters Patent is hereby corrected as shown below:

COLUMN 2

Line 6, "signal" should read --signals--;
    Line 29, "&he" should read --the--;
    Line 31, "adding" should read --indicate adding--;
    Line 36, "adding amplifiers 30-1 30-2;" should read --adding amplifiers 30-1 and 30-2;--;
    Line 37, "amplified" should read --amplifier--; and
    Line 46, "35-1 and reference numerals 35-2" should read --reference numerals 35-1 and 35-2--.

COLUMN 5

Line 13, "hand" should read --hand,--.

Signed and Sealed this

Thirteenth Day of July, 1993

Attest:

MICHAEL K. KIRK

Attesting Officer    Acting Commissioner of Patents and Trademarks